United States Patent [19]
Viscovich et al.

[11] Patent Number: 5,431,007
[45] Date of Patent: Jul. 11, 1995

[54] THERMOCHEMICALLY RECUPERATED AND STEAM COOLED GAS TURBINE SYSTEM

[75] Inventors: Paul W. Viscovich, Longwood; Ronald L. Bannister, Winter Springs, both of Fla.

[73] Assignee: Westinghouse Elec Corp, Pittsburgh, Pa.

[21] Appl. No.: 205,448

[22] Filed: Mar. 4, 1994

[51] Int. Cl.$^6$ .............................. F02C 3/20; F02C 3/30
[52] U.S. Cl. .................................... 60/39.05; 60/39.12; 60/39.59
[58] Field of Search ................. 60/39.02, 39.05, 39.06, 60/39.12, 39.511, 39.55, 39.58, 39.59, 723

[56] References Cited

U.S. PATENT DOCUMENTS

| | | | |
|---|---|---|---|
| 3,334,486 | 8/1967 | Scholz | 60/39.02 |
| 3,443,790 | 5/1969 | Buckland | 253/39.1 |
| 3,765,167 | 10/1973 | Rudolph et al. | 60/39.12 |
| 3,895,488 | 7/1975 | Koch | 60/39.511 |
| 4,185,456 | 1/1980 | Cummings | 60/39.12 |
| 4,384,452 | 5/1983 | Rice | 60/39.182 |
| 4,424,668 | 1/1984 | Mukherjee | 60/39.182 |
| 4,550,562 | 11/1985 | Rice | 60/39.02 |
| 4,571,935 | 2/1986 | Rice | 60/39.05 |
| 5,048,284 | 9/1991 | Lywood et al. | 60/39.12 |
| 5,133,180 | 7/1992 | Horner et al. | 60/39.12 |

OTHER PUBLICATIONS

L V Arsen'ev, et al., "A highly-efficient combined-cycle plant with steam-cooled gas turbine", pp. 111-114, Thermal Engineering 37 (3) 1990.

L. V. Arsen'ev, et al., "Improvement of Combined-Cycle Installations with Steam Cooling of Gas Turbines", pp. 201-206, Thermal Engineering, vol.4, No.3, 1993.

Yu. S. Vasil'ev, "Research Work at the St. Petersburg State University of Engineering", pp. 167 & 168, Thermal Engineering, vol.40, No.3, 1993.

D. A. Little, et al., "Development of Advanced Gas Turbine Systems", The American Society of Mechanical Engineers, Book No. 100348—1993.

C. S. Know & T. E. Duffy, "Once-Through Methane/Steam Reformer Design Evaluation for the Chemically Recuperated Gas Turbine", Consultant Report, California Energy Commission, Aug. 1992.

J. Janes, P. E., "Chemically Recuperated Gas Turbine", Staff Report, California Energy Commission, Oct. 1992.

J. Janes, P. E., "Chemically Recuperated Gas Turbine", Staff Report Draft, California Energy Commission, Jan. 1990.

Primary Examiner—Louis J. Casaregola
Attorney, Agent, or Firm—M. G. Panian

[57] ABSTRACT

A gas turbine system in which the expanded gas from the turbine section is used to generate the steam in a heat recovery steam generator and to heat a mixture of gaseous hydrocarbon fuel and the steam in a reformer. The reformer converts the hydrocarbon gas to hydrogen and carbon monoxide for combustion in a combustor. A portion of the steam from the heat recovery steam generator is used to cool components, such as the stationary vanes, in the turbine section, thereby superheating the steam. The superheated steam is mixed into the hydrocarbon gas upstream of the reformer, thereby eliminating the need to raise the temperature of the expanded gas discharged from the turbine section in order to achieve effective conversion of the hydrocarbon gas.

21 Claims, 2 Drawing Sheets

THERMOCHEMICALLY RECUPERATED AND STEAM COOLED GAS TURBINE SYSTEM

Reference to Government Grants

Development for this invention was supported in part by U.S. Department of Energy contract DE-AC21-93MC30247. Accordingly, the United States government may have certain rights in the invention.

BACKGROUND OF THE INVENTION

The present invention relates to a gas turbine system for producing power. More specifically, the present invention relates to a thermochemically recuperated and steam cooled gas turbine system.

A gas turbine is comprised of a compressor section that produces compressed air that is subsequently heated by burning fuel in a combustion section. The hot gas from the combustion section is directed to a turbine section where the hot gas is used to drive a rotor shaft to produce power.

The turbine section typically employs a plurality of stationary vanes circumferentially arranged in rows. Since such vanes are exposed to the hot gas discharging from the combustion section, cooling these vanes is of utmost importance. Traditionally, cooling was accomplished by bleeding compressed air produced in the compressor section and flowing it through a central passage formed in the airfoil portion of the vane, which is essentially hollow. Typically, a number of small passages were formed inside the vane airfoil that extend from the central passage to the surfaces of the vane, such as the leading and trailing edges or the suction and pressure surfaces. After the cooling air exits the vane passages, it enters and mixes with the hot gas flowing through the turbine section.

Unfortunately, the tradition approach to cooling the turbine vanes has a detrimental impact on the thermal efficiency of the gas turbine. Although the cooling air eventually mixes with the hot gas expanding in the turbine, since it bypasses the combustion process the work recovered from the expansion of the compressed cooling air is much less than that recovered from the expansion of the compressed air heated in the combustors. In fact, as a result of losses due to pressure drop and mechanical efficiency, the work recovered from the cooling air is less than that required to compress the air in the compressor. Thus, it would be desirable to provide cooling to the stationary vanes without the need to bleed compressed air.

Natural gas is one of the most common fuels burned in the combustion section. The major component of natural gas is typically methane. It has been found that at elevated temperature and in the presence of a catalyst, typically nickel based, methane reacts with steam and is converted to hydrogen and carbon monoxide. It has been proposed that such reformed fuel can be advantageously produced and burned in the combustor of a gas turbine by using the exhaust gas discharging from the turbine to heat the natural gas—see, for example, U.S. Pat. No. 5,133,180 (Horner et al.)—thereby increasing the efficiency of the gas turbine and reducing NOx production.

Unfortunately, in order to utilize the turbine exhaust gas as the source of heat for the reforming process, it had been thought that the temperature of the exhaust gas must be in excess of 650° C. (1200° F.), and optimally 815° C. (1500° F.). However, the temperature of the gas exhausting from the turbine section of a gas turbine is typically less than 540° C. (1000° F.). Thus, it has been proposed to use a turbine with high and low pressure sections, with a reheat combustor located between the sections. The reheat combustor could then heat the gas entering the low pressure turbine so that its exhaust was in the appropriate temperature range for reforming the natural gas. Unfortunately, low temperature turbines are generally not capable of such high temperature operation. Alternatively, it has been proposed that a duct burner be incorporated upstream of the reformer to heat the exhaust gas into the required temperature range. However, the additional fuel burned in the duct burner has a negative impact on the thermodynamic efficiency of the gas turbine system.

It is therefore desirable to provide an apparatus and method for heating a mixture of steam and gaseous hydrocarbon fuel in a reformer that utilizes turbine exhaust gas for heating without the need to raise the temperature of the exhaust gas by burning additional fuel.

SUMMARY OF THE INVENTION

Accordingly, it is the general object of the current invention to provide an apparatus and method for heating a mixture of steam and gaseous hydrocarbon fuel in a reformer that utilizes turbine exhaust gas for heating without the need to raise the temperature of the exhaust gas by burning additional fuel.

Briefly, this object, as well as other objects of the current invention, is accomplished in a gas turbine system for producing power comprising a turbine section, a steam generator and a reformer. The turbine section expands a hot compressed gas, thereby producing shaft power and an expanded gas, and discharges the expanded gas. The turbine has a plurality of components therein exposed to the hot compressed gas and a cooling fluid flow path is formed in at least a portion of these components. The steam generator transfers heat from the expanded gas to feedwater so as to produce steam. The reformer has means for converting a hydrocarbon gas to hydrogen and carbon monoxide by transferring heat from the expanded gas to the hydrocarbon gas and by bringing the hydrocarbon gas into contact with heated cooling steam. The gas turbine system also includes means for directing at least a first portion of the steam from the steam generator to the turbine cooling fluid flow path for flow therethrough, whereby the first portion of the steam forms the cooling steam. As a result of the cooling steam flowing through the cooling fluid flow path, the cooling steam is heated and the components are cooled.

According to one embodiment of the invention, the components in which the cooling fluid flow path are formed comprises a plurality of stationary vanes circumferentially arranged within the turbine section. In this embodiment, each of the vanes has a passage formed therein through which the steam flows.

DESCRIPTION OF THE PREFERRED EMBODIMENT

Figure 1:
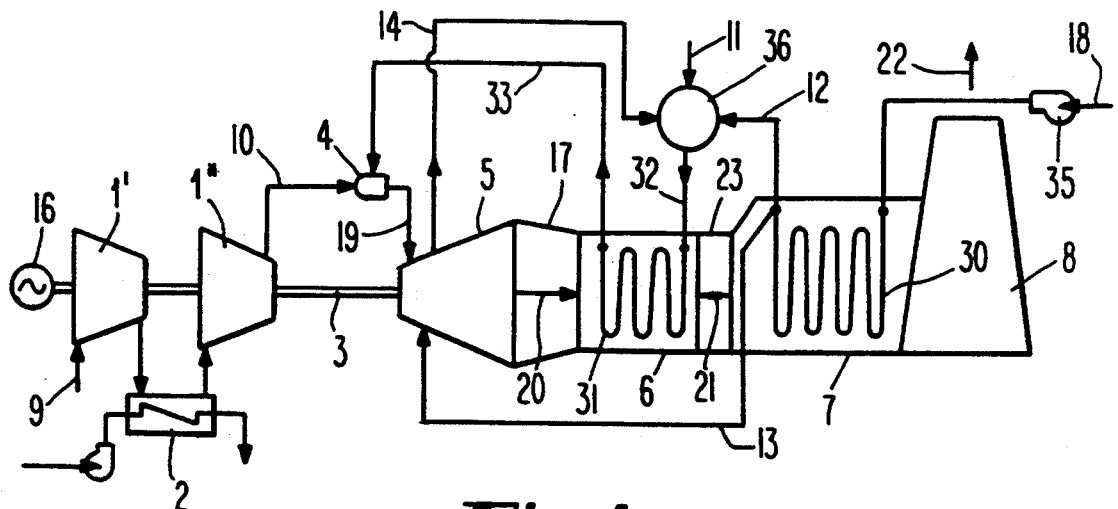
FIG. 1 is a schematic diagram of the gas turbine system according to the current invention.

Referring to the drawings, there is shown in FIG. 1 a schematic diagram of the gas turbine system according to the current invention. The major components of the system include a compressor section composed of a low pressure compressor section 1' and a high pressure compressor section 1", a combustion section 4, a turbine section 5, a rotor 3, a reformer 6, a heat recovery steam generator 7 ("HRSG"), and an exhaust stack 8.

In operation, ambient air 9 is drawn into the low pressure section 1' of the compressor. After being partially compressed, the air is cooled in an intercooler 2 supplied with cooling water. The cooled partially compressed air is then further compressed in a high pressure section 1" of the compressor. From the compressor 1", the compressed air 10 is directed to the combustion section 4 in which a fuel 33, at least partially reformed as discussed further below, is burned to produce a hot compressed gas 19. In a modern gas turbine, the hot compressed air discharging from the combustion section 4 may be in excess of 1370° C. (2500° F.). The hot compressed gas 19 is then directed to a turbine section 5, wherein it is expanded so as to produce an expanded gas 20 and generate work to drive the rotor 3. The rotor 3 drives the low pressure compressor 1' and high pressure compressor 1" and an electric generator 16 that produces electrical power.

The expanded gas 20, although its temperature has been reduced in flowing through the turbine section 5, is still relatively hot—typically at least 480°–540° C. (900°–1000° F.). According to the current invention, the expanded gas 20 is directed by a duct 17 to a reformer 6, wherein heat is transferred from the expanded gas 20 to a mixture 32 of a hydrocarbon gas and steam, as discussed further below. The partially cooled expanded gas 21 is then directed by duct 23 to the HRSG 7. The HRSG 7 is also supplied with feedwater 18 by a pump 35. The feedwater 18 flows through a plurality of tubes 30 exposed to the expanded gas 21 so that heat is transferred from the expanded gas to the feedwater, thereby generating steam 12. Although for simplicity a once through HRSG 7 is shown in FIG. 1, it should be understood that a recirculating HRSG comprising a deareator and one or more economizers, evaporators, steam drums and superheaters, as is well known in the art, may also be utilized. In the preferred embodiment, the HRSG 7 does not incorporate a superheater so that the steam 12, 13 discharged from the HRSG is saturated steam. The expanded gas 22 discharged from the HRSG 7, now further cooled, is exhausted to atmosphere via the stack 8.

A first portion 12 of the steam produced in the HRSG 7 is directed to a mixer 36, which may simply be a length of piping or a chamber. In the mixer 36, the steam 12 is mixed with a gaseous hydrocarbon fuel 11, such as a methane rich natural gas, that is also supplied to the mixer. According to an important aspect of the current invention, a second portion 13 of the steam from the HRSG 7 is directed to the turbine section 5. As discussed further below, in the turbine section 5 the steam 13 flows through components that are exposed to the hot compressed gas 19 from the combustor 4. As a result, the steam 13 absorbs heated from those components, thereby cooling them. The now superheated steam 14, which in the preferred embodiment is heated to approximately 1090° C. (2000° F.), is discharged from the turbine section 5 and then directed to the mixer 36, where it mixes with the hydrocarbon gas 11 and the saturated steam 12, thereby raising the temperature of the mixture. In the preferred embodiment, the gas/steam mixture 32 is heated to approximately 480° C. (900° F.)

From the mixer 36, the hydrocarbon gas/steam mixture 32 is directed to a reformer 6. The reformer 6 contains a plurality of tubes 31 exposed to the expanded gas 20 discharged from the turbine section 5. The hydrocarbon gas/steam mixture 32, flows through the tubes 31 so that heat is transferred from the expanded gas 20 to the hydrocarbon gas/steam mixture 32, thereby further heating the mixture. As a result of being heated in the reformer 6, at least a portion of the methane in the hydrocarbon fuel 11, as well as the ethane and other higher hydrocarbons in the fuel, and the steam chemically react to form hydrogen and carbon monoxide, as follows:

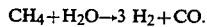

$$CH_4 + H_2O \rightarrow 3 H_2 + CO.$$

The amount of the methane thus converted depends on the ratio of steam to methane, the temperature to which the mixture is heated, and the pressure of the mixture. In the preferred embodiment, the ratio of steam to hydrocarbon gas is at least 1.5 and the pressure of the gas/steam mixture is in the range of approximately 700–1380 kPa (100–200 psi). In the preferred embodiment, a considerable amount of excess steam is provided so that the reformed fuel 33 discharged from the reformer 6 is a hydrogen rich gaseous fuel that also contains unreformed methane, carbon monoxide and water vapor. In addition, a catalyst, which may be nickel based, may be utilized in the reformer 6 to further promote the reaction. In the preferred embodiment, the catalyst is a chrome-nickel based alloy that is applied to the heat transfer surfaces of the reformer 6 in a thin layer. Suitable catalysts may be obtained from Imperial Chemical Industries. The reformed fuel 33 has wide flammability limits and results in low adiabatic flame temperature, thereby considerably reducing the formation of NOx.

According to an important aspect of the current invention, as a result of the use of the high temperature of the steam 14, achieved by superheating in the turbine section 5, adequate hydrocarbon gas conversion rates are obtained without the need to consume addition fuel raising the temperature of the expanded gas 20 exhausted from the turbine section 5.

Figure 2:
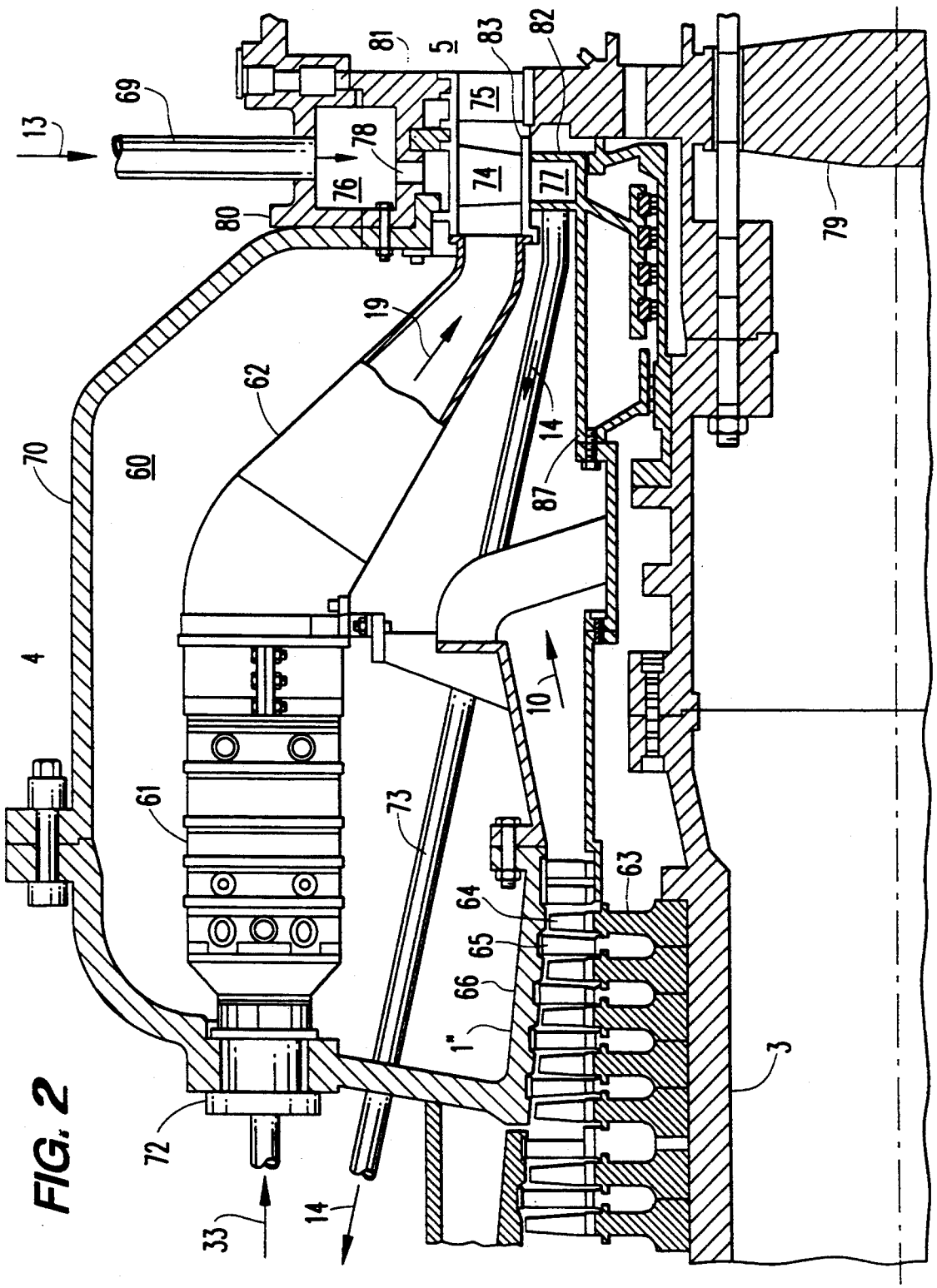
FIG. 2 is a longitudinal cross-section through a portion of the combustor and turbine sections of the gas turbine shown in FIG. 1.

FIG. 2 shows a longitudinal cross-section of a portion of the low pressure compressor 1' and high pressure compressor 1", combustion 4, and turbine 5 sections of the gas turbine according to the current invention. As can be seen, the rotor 3 is centrally disposed and extends through the three sections. The high pressure compressor section 1" is comprised of a cylinder 66 that encloses alternating rows of stationary vanes 65 and rotating blades 64. The stationary vanes 65 are affixed to a cylinder 66 and the rotating blades 64 are affixed to discs 63 attached to the rotor 3.

The combustion section 4 is comprised of a shell 70 that forms a chamber 60 in which are disposed a plurality of combustors 61 and ducts 62 that connect the combustors to the turbine section 5. The reformed fuel 33 enters the combustors 61 through nozzles 72 and is burned therein. A cylindrical shell 87 encloses the portion of the rotor 3 that extends through the combustion section 4.

The turbine section 5 is comprised of an outer cylinder 80 that encloses an inner cylinder 81 so as to form an outer annular manifold 76 therebetween. The inner cylinder 81 encloses a row of stationary vanes 74 and a row of rotating blades 75. The stationary vanes 74 are affixed to the inner cylinder 81 and the rotating blades 75 are affixed to a disc 79 that forms a portion of the turbine section of the rotor 3.

The compressed air 10 enters the combustors 61 through openings formed therein. In the combustors 61, the reformed fuel 33 is mixed with the compressed air 10 and burned, thereby forming the hot compressed gas 19. The hot compressed gas 19 flows through the ducts 62 and then through the rows of stationary vanes 74 and rotating blades 75 (as well as additional, downstream rows of stationary vanes and blades not shown) in the turbine section 5, wherein the gas expands and generates power that drives the rotor 3.

Figure 3:
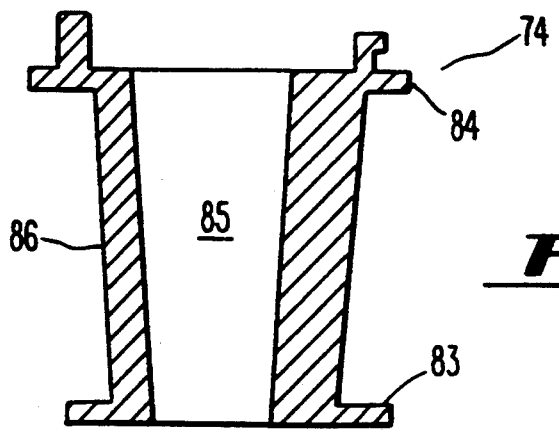
FIG. 3 is a cross-section through the turbine vane shown in FIG. 2.

As shown in FIG. 2, a pipe 69 directs the saturated steam 13 from the HRSG 7 to the outer annular manifold 76. From this manifold, the steam flows through a plurality of holes 78 dispersed around the inner cylinder 81 and then through the turbine vanes 74. As shown in FIG. 3, each of the turbine vanes 74 is comprised of an airfoil 86 having inner and outer shrouds 83 and 84, respectively, formed on its ends. According to the current invention, the airfoil 86 is hollow, having a passage 85 formed therein. The passage 85 has an inlet formed in the outer shroud 84 and an outlet formed in the inner shroud 83.

Thus, the steam 13 flows through the passages 85 in the vanes 74 so that heat is transferred from the vane to the steam. As a result, the vane 74 is cooled and the steam 13 is heated. Since steam cooling is more effective than the air cooling traditionally used for vane cooling, the temperature of the hot gas 19 can be increased without over heating the vanes 74. In addition, no compressed air need be bled from the low pressure compressor 1' or high pressure compressor 1" for cooling the vanes 74. Thus, the thermodynamic performance of the gas turbine is improved.

Returning to FIG. 2, an inner annular manifold 77 is formed by a housing 82 that extends radially outward from the cylindrical shell 87 and mates with the inner shrouds 83 of the vanes 74. Thus, upon exiting the vanes 74, the superheated steam 14 flows into the inner manifold 77. From the inner manifold 77, the superheated steam 14 is directed by pipe 73 away from the turbine section 5, through the combustion section 4, and then through the shell 70. The pipe 73 discharges the superheated steam 14 to the mixer 36, as previously discussed.

Thus, according to the current invention, adequate rates of gaseous hydrocarbon fuel 11 reforming are achieved without the need to increase the temperature of the expanded gas 20 discharged from the turbine. This is accomplished by pre-heating the steam 13, produced by the HRSG 7, that mixes with the fuel 11, while simultaneously effectively cooling the turbine vanes 74 in a manner that increases the thermodynamic performance of the gas turbine. Note that although FIG. 2 shows the steam 13 being used to cool only the first row of turbine vanes 74, it should be understood that the steam could also be used to cool downstream rows of vanes as well, or used to cool the rotating blades 75 or other high temperature components.

Figure 4:
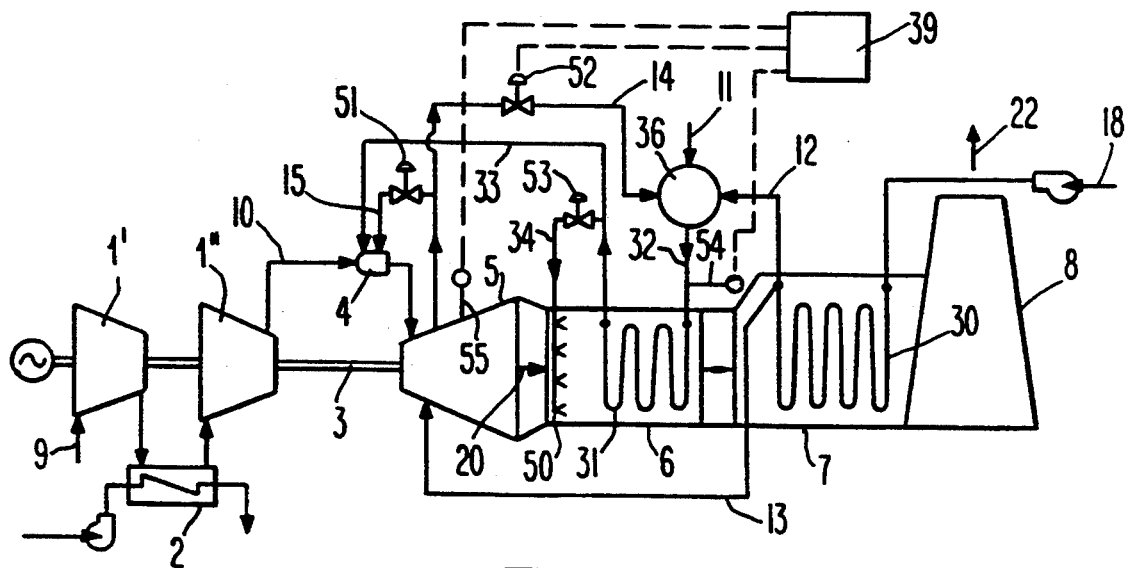
FIG. 4 is a schematic diagram of another embodiment of the gas turbine system according to the current invention.

FIG. 4 shows an another embodiment of the current invention that allows a portion 34 of the reformed fuel, as regulated by control valve 53, to be directed to a duct burner 50 located immediately upstream from the reformer 6. The use of the optional duct burner 50 allows supplemental heating of the expanded gas 20, if necessary—for example, during part load operation or at start-up.

As also shown in FIG. 4, a control valve 52 is incorporated to regulate the flow of superheated steam 14 from the turbine section 5. By adjusting the control valve 52, the amount of superheated steam 14, relative to the amount of saturated steam 12 directly from the HRSG 7, that enters the mixer 36 can be regulated so as to control the temperature of the hydrocarbon gas/steam mixture 32 entering the reformer 6. In addition, the control valve 52 can be used to regulate the temperature of the vanes 74 or any other components cooled by the steam 13. In this regard, temperature sensors 54 and 55 are located in the reformer 6 inlet and the turbine section 5, respectively, to measure the temperature of the mixture 32 entering the reformer 6 and the temperature of the cooled turbine components. Signals from these temperature sensors are directed to a control system 39 that operates the control valve 52 to provide the desired temperature control.

As also shown in FIG. 4, a control valve 51 is utilized to allow a portion 15 of the superheated steam from the turbine section 5 to be injected into the combustion section, specifically into the combustors 61 to further reduce NOx and increase the mass flow through the turbine, thereby increasing its power output.

The present invention may be embodied in other specific forms without departing from the spirit or essential attributes thereof and, accordingly, reference should be made to the appended claims, rather than to the foregoing specification, as indicating the scope of the invention.

We claim:

1. A gas turbine system for producing power, comprising:

a) a turbine section for expanding a hot compressed gas, thereby producing shaft power and an expanded gas that is discharged therefrom, said turbine having a plurality of components therein exposed to said hot compressed gas, a cooling fluid flow path formed in at least a portion of said components;

b) a steam generator for transferring heat from said expanded gas to feedwater so as to produce steam;

c) means for directing at least a first portion of said steam to said turbine cooling fluid flow path formed in said portion of said components for flow therethrough, whereby said first portion of said steam forms cooling steam, said cooling steam being heated so as to form heated cooling steam and said portion of said components being cooled as a result of said cooling steam flowing through said cooling fluid flow path;

d) a reformer having means for converting a hydrocarbon gas to hydrogen and carbon monoxide by transferring heat from said expanded gas to said hydrocarbon gas and by bringing said hydrocarbon gas into contact with at least a first portion of said heated cooling steam.

2. The gas turbine system according to claim 1, wherein said portion of said components in which said cooling fluid flow path is formed comprises a plurality of stationary vanes circumferentially arranged within said turbine section.

3. The gas turbine system according to claim 2, wherein said cooling fluid flow path comprises a passage formed in each of said vanes.

4. The gas turbine system according to claim 3, wherein each of said passages in said vanes has an inlet and an outlet, and wherein said cooling fluid flow path further comprises an inlet manifold in flow communication with said passage inlets and an outlet manifold in flow communication with said passage outlets.

5. The gas turbine system according to claim 4, wherein said turbine section comprises a shell enclosing said vanes and said inlet and outlet manifolds.

6. The gas turbine system according to claim 1, wherein said means for converting hydrocarbon gas comprises a plurality of tubes exposed to said expanded gas, said heated cooling steam being in flow communication with tubes.

7. The gas turbine system according to claim 1, wherein said reformer has an inlet in flow communication with said turbine section, whereby said reformer receives said expanded gas from said turbine section.

8. The gas turbine system according to claim 7, wherein said steam generator has an inlet in flow communication with said reformer, whereby said steam generator receives said expanded gas from said reformer.

9. The gas turbine system according to claim 1, further comprising a combustor for producing said heated compressed gas by burning therein said hydrogen and carbon monoxide converted in said reformer.

10. The gas turbine system according to claim 9, further comprising means for directing a second portion of said heated cooling steam from said turbine section to said combustor for introduction therein.

11. The gas turbine system according to claim 1, further comprising means for heating said expanded gas.

12. The gas turbine system according to claim 11, wherein said means for heating said expanded gas is disposed between said turbine section and said reformer, whereby said expanded gas is heated prior to said transfer of said heat from said expanded gas to said hydrogen gas in said reformer.

13. The gas turbine system according to claim 1, wherein said hydrocarbon gas comprises methane.

14. A gas turbine system for producing power, comprising:
a) a turbine section having means for producing power by flowing a hot compressed gas over a plurality of components, thereby expanding said hot compressed gas so as to form an expanded gas;
b) means for producing steam;
c) means for cooling said turbine components and heating said steam by flowing said steam through said turbine components;
d) means for bringing said heated steam into contact with a hydrocarbon gas, thereby heating said hydrocarbon gas and forming a steam and hydrocarbon gas mixture; and
e) means for converting at least a portion of said hydrocarbon gas to hydrogen and carbon monoxide by transferring heat from said expanded gas from said turbine section to said steam and hydrocarbon gas mixture, thereby further heating said mixture.

15. The gas turbine system according to claim 14, wherein said means for converting at least a portion of said hydrocarbon gas to hydrogen and carbon monoxide comprises a reformer having a first flow path through which said mixture of steam and hydrocarbon gas flows and a second flow path through which said expanded gas from said turbine flows.

16. A method of producing power in a gas turbine system having a turbine section for expanding a hot compressed gas, thereby producing an expanded gas, said turbine having a plurality of components therein exposed to said hot compressed gas, comprising the steps of:
a) directing steam to flow through said components so as to transfer heat therefrom to said steam, thereby heating said steam and cooling said components;
b) bringing said heated steam into contact with a hydrocarbon gas, thereby heating said hydrocarbon gas and forming a steam and hydrocarbon gas mixture; and
c) converting at least a portion of said hydrocarbon gas to hydrogen and carbon monoxide by transferring heat from said expanded gas produced by said turbine section to said steam and hydrocarbon gas mixture, thereby heating said mixture.

17. The method according to claim 16, further comprising the step of combusting said hydrogen and carbon monoxide in compressed air, thereby producing said hot compressed gas that is expanded in said turbine.

18. The method according to claim 16, further comprising the step of transferring heat from said expanded gas to feed water so as to produce said steam that flows through said turbine components.

19. The method according to claim 16, wherein said turbine components through which said steam flows comprises stationary vanes for directing the flow of said hot compressed gas through said turbine.

20. The method according to claim 16, wherein the step of converting at least a portion of said hydrocarbon gas to hydrogen and carbon monoxide further comprises the step of bringing said heated mixture of steam and hydrocarbon gas into contact with a catalyst.

21. The method according to claim 16, wherein said turbine components through which said steam flows comprises rotating blades.

* * * * *